INVENTOR
DARL BENNER, JR.

United States Patent Office 3,505,875
Patented Apr. 14, 1970

3,505,875
PRESSURE TRANSDUCER
Darl Benner, Jr., Covina, Calif., assignor, by mesne assignments, to Genisco Technology Corporation, a corporation of California
Filed Mar. 14, 1968, Ser. No. 713,191
Int. Cl. G01l 7/08
U.S. Cl. 73—407          6 Claims

ABSTRACT OF THE DISCLOSURE

A differential pressure transducer for indicating the difference between two absolute pressures with consistent sensitivity for different absolute values is provided. The invariant sensitivity for equal differential pressures under different absolute pressure values is realized by unique diaphragms for transducing the respective pressures into physical movements. Each diaphragm is in the form of a metal disc having its periphery rigidly and sealingly secured and its central portion free to move in a direction normal to the plane of the diaphragm. This movement is accommodated by annular axially directed wall portions of the disc defining flexures and formed by means of annular grooves. The flexure arrangement is such that radially directed components of the pressure force are canceled in the flexure means so that a consistent reaction force to a given differential pressure is provided independent of the absolute pressure.

---

This invention relates generally to pressure transducers and more particularly to an improved differential pressure transducer for indicating accurately the difference between first and second pressures with substantially equal sensitivity over a large range of absolute pressure values.

Differential pressure transducers of the type under consideration are used to indicate pressure differences of the order of ten to one thousand pounds, by way of example, between first and second absolute pressures which may vary in value between zero and three thousand pounds per square inch. The transducers themselves take the form of a body having opposite cavities defining therebetween a bending beam. Suitable diaphragms are incorporated in each of the cavities and the first and second pressures in turn are coupled to the exterior surfaces of these diaphragms. The inner surfaces of the diaphragms in turn act through suitable force transmitting means to midpoints on opposite sides of the bending beam so that the net movement of the bending beam is a consequence of the difference between the forces applied through the diaphragms. Conventional strain gauges are attached to the bending beam to provide an electrical read-out signal which will vary in accord with the differential pressure.

Normally, the output readings which may be in millivolts will be directly proportional to the differential pressure. The slope of the line representing this proportional relationship determines the sensitivity of the transducer; that is, the rate of change of the millivolt output for a given change in the differential pressure.

A major problem associated with the above types of transducers concerns the changing of the sensitivity for different values of absolute pressures applied to the diaphragms. For example, if one diaphragm is subject to atmospheric pressure and the other side subject to a pressure of two hundred pounds per square inch above atmosphere there will be provided an output reading corresponding to the differential pressure of two hundred pounds per square inch. If the first pressure should be eight hundred pounds per square inch and the second pressure one thousand pounds per square inch, there will again be provided an output reading but this output reading will not ordinarily be two hundred pounds per square inch but some value different from two hundred pounds per square inch. This different value is a consequence of the presence of the absolute high pressures of eight hundred pounds per square inch and one thousand pounds per square inch respectively always being exerted on the diaphragms.

As a consequence of the foregoing, it is necessary to recalibrate the transducer when it is to be employed to measure pressure differences between first and second pressures having changed absolute values even though the difference between the absolute values may be the same.

One of the reasons for the change in sensitivity with changes in the absolute values of the pressures is the generation of tangential or radially directed force components in the diaphragms themselves with increasing absolute pressures exerted thereon. These forces tend to stretch the diaphragm and thus change the reaction force characteristics of the diaphragm when the same is moved in a normal direction by the pressures involved. It can be appreciated that if each of the diaphragms is stretched by such tangential or radial forces in the plane of the diaphragm, a greater normal force is necessary to effect normal movement. It can thus be expected that the differential output readings of the bending of the beam between relatively high absolute pressures applied to the diaphragms will be less than readings for the same differential output pressure where the absolute pressures are relatively low. Under these latter conditions, the diaphragms are more "compliant" and thus the normal pressures to be measured will all be transmitted to the bending beam and very small portions of these pressures will be absorbed by the diaphragms themselves.

In efforts to solve the foregoing problem in the past, it has been proposed to fill the interior cavities with oil under a suitable pressure to counteract the absolute pressures exerted on the diaphragms. However, the introduction of oil or another fluid medium to effect this end renders the transducer temperature sensitive and temperature limited, variations in temperature tending to expand or contract the volume of oil and thus affecting the degree of compensation afforded. In addition, an oil filled cavity represents a potential danger should any leakage occur.

In other instances, fairly complex mechanical type linkages have been proposed in an effort to render the sensitivity invariant over large changes in absolute pressures. Such proposals not only increase the overall cost of manufacture of such pressure transducers, but because of the increased number of components involved, the reliability of the transducers is decreased.

With the foregoing considerations in mind it is a primary object of the present invention to provide a vastly improved differential pressure transducer wherein the sensitivity is substantially invarient over a relatively large range of absolute pressure values.

Another important object is to provide a differential pressure transducer having a consistent sensitivity over a wide range of absolute pressures without incorporating any type of compensating fluid pressures or complicated linkage mechanisms to the end that the transducer will operate substantially independently of temperature variations.

Still another important object is to provide an improved differential pressure transducer having a consistent sensitivity over a wide range of absolute pressures by effecting only a minor modification of conventional differential pressure transducer bodies involving the substitution of novel diaphragms with the result that there is substantially no increase in manufacturing expense and no decrease in overall reliability.

Briefly, these and many other objects and advantages of this invention are attained by providing novel diaphragms in a transducer body incorporating the usual bending beam with strain gauges. Each of the diaphragms is in the form of a circular disc having a given thickness. The peripheral marginal portion of the disc is rigidly and sealingly secured in the transducer body. An annular section of the disc radially inwardly of the peripheral marginal portion defines an annular flexure means such that the central area of the disc can move in a direction normal to its surface in response to fluid pressure. The annular flexure means is characterized in that radially directed force components derived from the fluid pressure are canceled by the flexure means so that any tension forces in the plane of the central area of the disc radially within the flexure means are substantially invariant with changing fluid pressures exerted on the disc.

When diaphragms formed in the foregoing manner are incorporated in the pressure transducer, the sensitivity or rate of change of output readings for changes in differential pressure will remain consistent over a wide range of absolute pressures applied to the diaphragms.

In the preferred embodiment of the invention, the movement of the diaphragm is transmitted to the bending beam through a ball bearing centrally disposed to engage the center of the diaphragm and one side of the bending beam. This ball bearing assures that the communicated forces will be normal to the plane of the diaphragm.

A better understanding of the invention will be had by now referring to the accompanying drawings, in which.

Figure 1:
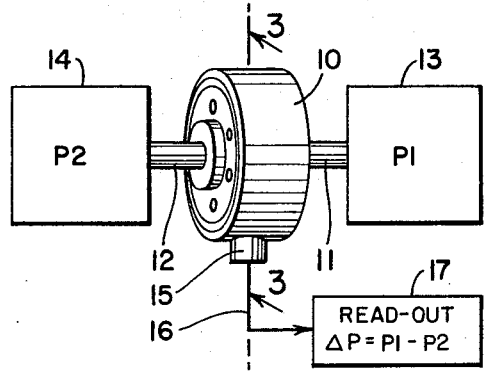
FIGURE 1 is a highly schematic view of a differential pressure transducer incorporating the present invention.

Referring first to FIGURE 1 there is shown a differential pressure transducer 10 having fluid pressure input lines 11 and 12 from first and second pressure sources 13 and 14. The difference between the pressures P1 and P2 is transduced to an electrical signal and passed from a bottom collar 15 and lead 16 to an electrical readout 17. This output may comprise a millivolt meter calibrated to read directly the differential pressure. The pressure sources themselves may constitute gas or liquids and under normal conditions, only the variations in the difference between the two pressures are desired to be known.

Figure 2:
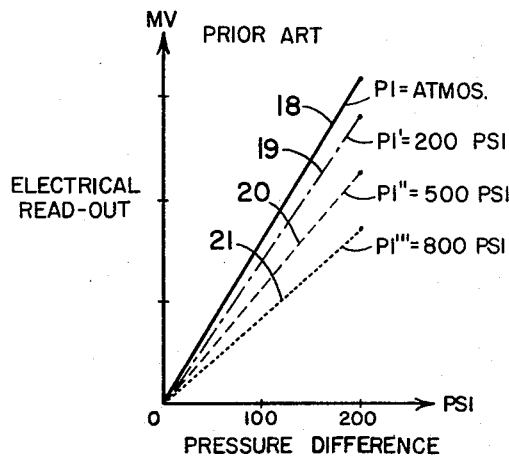
FIGURE 2 illustrates a series of sensitivity curves characteristic of prior art transducers under varying conditions of absolute pressures.

Referring now to FIGURE 2 there is shown the variation in millivolt output reading for changes in the pressure difference for a conventional pressure transducer for indicating pressure differences in an environment such as indicated in FIGURE 1. The solid line plot 18 shows the linear relationship between the output reading and the pressure differential in pounds per square inch wherein the absolute pressure of, for example, the source P1 of FIGURE 1 is atmospheric. The slope of the plot 18 defines the sensitivity of the pressure transducer over the range from zero to two hundred pounds per square inch pressure differences. As an example, the variation in millivolt output reading may be from approximately zero to thirty millivolts.

If the same pressure transducer is used to measure pressure differences wherein the absolute pressure of the source P1 is, for example, two hundred pounds per square inch, the sensitivity plot will follow the dashed dot line 19. Similarly, if the absolute pressure P1 should vary to the values such as five hundred pounds per square inch and eight hundred pounds per square inch as indicated at P1″ and P1‴, plots such as the dashed line 20 and the dotted line 21 will result.

It will be evident from the foregoing that as the absolute pressures in the sources P1 and P2 increase, the millivolt output for given differences in the pressures decreases; that is, the slopes of the plots change and thus the sensitivity of the transducer changes. Actually, not only do the end points at the highest range of the transducer vary as clearly indicated in FIGURE 2, but also the initial or zero pressure differential point varies. However, the transducer may readily be adjusted to provide a consistent zero reading for different absolute pressures.

Figure 3:
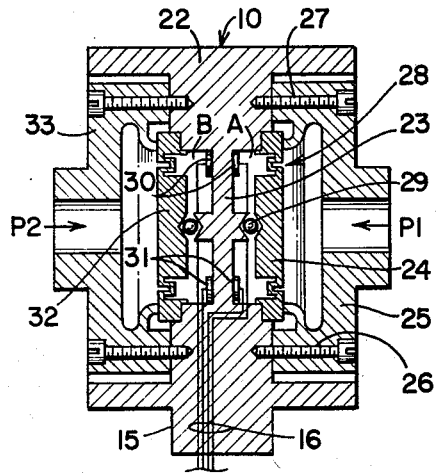
FIGURE 3 is a cross section taken in the direction of the arrows 3—3 of FIGURE 1 illustrating the transducer of the present invention.

Referring now to the cross section of FIGURE 3, there is illustrated the improved transducer of the present invention wherein the changing sensitivities characterizing prior art transducers and as described in FIGURE 2 are avoided.

In FIGURE 3, the transducer comprises an integral body 22, preferably cylindrical in form as illustrated in FIGURE 1, having cutout opposite first and second cavities designated generally by the letters A and B. Defined between these cavities is a bending beam structure 23. Opposite the right hand face of this bending beam 23 there is provided a diaphragm 24 positioned in the cavity A and having its outer surface exposed to the fluid pressure P1 through a fluid pressure coupling means in the form of a cover plate 25. This cover plate is secured to the body 22 as by bolts 26 and 27.

The diaphragm 24 is different from conventional type diaphragms employed in pressure transducers of this design and constitutes a novel feature of this invention. As shown, the diaphragm is in the form of a metal disc having a given thickness. The peripheral marginal portion of this disc is rigidly and sealingly secured to the periphery of the cavity A as by the cover plate 25. The disc includes an annular flexure means designated generally by the arrow 28 spaced radially inwardly from its peripheral marginal portion. This flexure means permits movement of the central area of the disc shaped diaphragm 24 in a direction normal to the plane of the diaphragm.

A force transmitting means in the form of a ball bearing 29 is disposed between one side of the bending beam 23 and the center of the disc 24 as illustrated for transmitting forces applied to the outer surface of the diaphragm to the bending beam 23.

As schematically indicated in FIGURE 3, the bending beam itself includes pairs of strain gauges 30 and 31 connected through the output leads 16 to a conventional bridge circuit (not shown) to provide the output signal.

The transducer device is symmetrical about a plane passing through the bending beam 23 and normal to the plane of the drawing. Thus, the second cavity B to the left side of the bending beam 23 includes a second diaphragm 32 in the form of a circular metal disc sealingly held at its periphery by a second fluid coupling means in the form of a cover plate 33 bolted to the body 22. Flexure means in the diaphragm 32 are provided along with a second ball bearing for transmitting forces applied to the second diaphragm to the bending beam in opposed relationship to the forces applied by the first diaphragm 24. From the configuration shown, it will be evident that the bending beam is subject to a net bending force constituting the difference between the applied forces which in turn will constitute the difference between the applied pressures P1 and P2.

Figure 4:
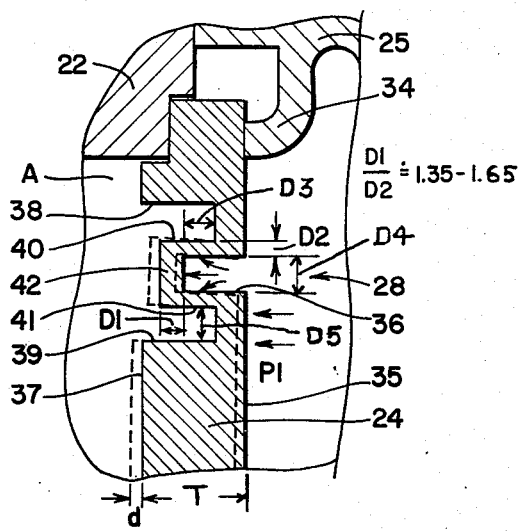
FIGURE 4 is an enlarged fragmentary cross section of a portion of the structure illustrated in FIGURE 3.

Referring now to FIGURE 4, the annular flexure means described in FIGURE 3 is shown in greater detail. In the upper portion of FIGURE 4, it will be noted that the cover plate 25 includes an inwardly and axially extending annular lip structure 34 which actually effects the securing and sealing of the peripheral marginal portion of the diaphragm against the periphery of the cavity A. When the bolts 26 and 27 described in FIGURE 3 are threaded into the main body 22, the end of the annular lip structure 34 actually bites into the metal of the diaphragm to provide the desired sealing. The peripheral marginal portion of the diaphragm is thus rigid with respect to the main body 22 and cover plate 25.

The outer surface of the diaphragm 24; that is, the surface subject to the pressure P1 is designated 35. This outer surface includes a first annular groove 36 which, in the embodiment disclosed, may be milled or otherwise machined into the metal disc itself constituting the diaphragm.

The inner surface of the diaphragm 24 is designated 37 in FIGURE 4 and this surface includes second and third annular grooves 38 and 39 disposed on either side of the first groove 36 such that the grooves overlap in an axial direction. There are thus provided common walls 40 and 41 for the first annular groove 36 and the adjacent walls of the second and third annular grooves.

The formation of these grooves in the disc is relatively critical in order to assure proper operation of the improved diaphragm of this invention. In this respect, the walls of the grooves are parallel to each other and extend in an axial direction. The bottom of the grooves in turn extends in transverse or radial directions and it will be evident that the spacing between the respective grooves is such that the dimension D1 for the floor of the first annular groove indicated at 42 is greater than the thickness in a radial direction of the common walls 40 and 41. This latter dimension is indicated at D2 for the common wall 40, the thickness of the other common wall 41 being of like value.

In another sense, the flexure means may be considered as being formed by a reduced thickness annular section of the disc 24 which extends radially for a first given distance, thence axially for a second given distance, this portion being further reduced in thickness, thence radially outwardly for a third given distance, thence axially in a direction opposite to the first axial direction for a distance corresponding to the second given distance, and thence radially outwardly towards the peripheral marginal portion of the disc. The axially extending portions of the further reduced thickness section would be as indicated at 41 and 40 and extend a distance D3. This distance defines the degree of overlap of the grooves as shown. The radially outward portion 42 extends over the third distance as indicated by D4. This distance also defines the width of the groove 36. D5 designates the width dimension between the groove walls 39 and 41 which would preferably be the same as between the groove walls 38 and 40. The thickness of the diaphragm is designated T.

Regardless of the manner in which the flexure means is considered to be formed, there results first and second spaced, parallel, axially extending, annular flexure walls.

It is important that the thickness dimension D1 for the radially outwardly extending portion 42 constituting the floor of the first annular groove be greater than the thickness D2 of the axially extending walls 40 and 41 in order that the walls themselves will function as flexures.

Best operation of the diaphragm is realized when the ratio of these dimensions $D1/D2$ is greater than 1.35 and les than 1.65. Proper adjustment of the ratio can be effected by milling the underside of the first annular groove 36; that is, the left side surface of the portion 42 in FIGURE 4. Part of this surface is shown as milled so that its plane lies slightly inwardly of the plane of the inner surface 37 of the disc.

The relationship and tolerable relative range of valves of the various other dimensions noted, can be summarized as follows:

$$\tfrac{1}{2}D4 < D5 < 2D4$$
$$D3 + 2D1 < T < 6D3$$
$$\tfrac{1}{2}D4 < D3 < 2D4$$

As a specific example, when $D1/D2 = 1.50$; $D4 \doteq D5$; $T \doteq D3 + 2D1$ less the small milled-off portion of the left surface of 4.2; $D3 \doteq D4$.

In the operation of the diaphgram structure as utilized in the differential transducer, consider first the application of an absolute pressure P1 on the right hand or outer surface 35 of the disc 24. This pressure P1 will act normally to all of the exposed outer surfaces of the diaphragm and will thus act normally against the inner surfaces of the axial walls 40 and 41 of the annular groove 36 as well as on the floor or bottom transverse portion of the groove 42. The laterally directed pressure on the axial walls 40 and 41 will tend to bow these walls away from each other while the force acting on the bottom or floor of the groove; that is, the portion 42 will tend to stretch the axial walls 40 and 41 to bring them back into a parallel relationship. The resulting flexing of the flexure wall is in a sense such as to cancel radially directed force components. The result is that the compliance of the central area of the disc 24 for movement in a generally back and forth direction as viewed in FIGURE 4 is invariant regardless of the absolute or static pressure always acting on the outer surface 35 of the diaphragm. In other words, any radial force components in the diaphragm that may result in the generation of tension forces in the central area of the diaphragm tending to stretch the same are substantially eliminated.

The manner in which the central portion of the diaphragm 24 in FIGURE 4 actually deflects under a differential pressure condition is illustrated by the dotted line showing of the diaphragm. In this showing, the actual movement over the distance $d$ is greatly exaggerated. It can be appreciated, however, that the flexural movement of the wall 40 will generate a radially inwardly directed component of force in the transverse portion 42 of the flexure whereas the flexural movement of the wall 41 will tend to generate a radially outwardly directed force component in the portion 42 with the overall result that the radial components tend to cancel in the flexural arrangement as described so that the movement of the diaphragm is only affected by normal forces.

The second diaphragm 32 for the differential pressure transducer as described in FIGURE 3 is identical in construction and forms a mirror image with the first diaphragm 24 as viewed in FIGURE 3.

Figure 5:
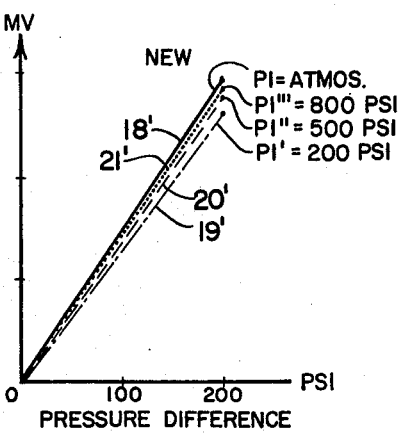
FIGURE 5 illustrates a series of sensitivity curves plotted under conditions similar to those depicted in FIGURE 2 but illustrating the improvement in operation realizable by the present invention.

Referring now to FIGURE 5, the vast improvement in the control of the sensitivity in view of the use of the novel diaphragms of this invention will be evident. In actual tests, plotting of the various sensitivity lines for different values of absolute pressure as was done in FIGURE 2 resulted in the slopes of the lines being almost identical. In FIGURE 5, however, the differences in slopes of the lines are exaggerated for purposes of clarity.

It was found, for example, that at atmospheric pressure there was provided the line 18'. At two hundred pounds per square inch absolute pressure as indicated at P1' there resulted the dash-dot line 19' which was the furthest deviation noted during the tests. At five hundred pounds per square inch absolute pressure as indicated at P1" the resulting dashed line 20' almost corresponded exactly with the first line 18', and at an absolute pressure of eight hundred pounds per square inch as indicated at P1''' the dotted line 21' was even closer to the original line.

The normally constantly decreasing output for the end point of the sensitivity curves for increasing absolute pressures as depicted in FIGURE 2 is thus wholly absent in the curves of FIGURE 5 and for all practical purposes, the sensitivity or slopes of the various curves are substantially equal.

From the foregoing description, it will thus be evident that the present invention has provided a greatly improved differential pressure transducer wherein all of the objects set forth heretofore are fully realized.

What is claimed is:

1. In a pressure transducer for providing an output indication of fluid pressure in response to a physical movement constituting a function of said pressure, an improved diaphragm for imparting said physical movement, said diaphragm comprising: a circular disc having an outer surface subject to said fluid pressure; and means for rigidly and sealingly securing a peripheral marginal portion of said disc over 360°, an annular section of said disc radially inwardly of said peripheral marginal portion defining an annular flexure means such that the central area of said disc and move in a direction normal to its surface in response to fluid pressure, said annular flexure means comprising an annular reduced thickness portion of said disc extending radially outward for a first given distance, thence in an axial direction for a second given distance, thence radially outward for a third given distance, thence in an axial direction opposite to said first-mentioned axial direction for a distance equal to said second given distance, and thence radially outwardly towards said peripheral marginal portion, the thickness of said reduced thickness portion being further reduced over said axial distances to define first and second spaced, parallel, axially extending, annular flexure walls so that radially directed force components derived from said fluid pressure are substantially cancelled by said flexure means whereby any tension forces in the plane of said central area of said disc radially within said flexure means are substantially invariant with changing fluid pressures exerted on said disc.

2. The subject matter of claim 1, in which said tension forces are substantially zero.

3. The subject matter of claim 1, in which the ratio of said reduced thickness portion extending radially outwardly for said third given distance, to the further reduced thickness of each of said axially extending walls, is between 1.35 and 1.65.

4. In a differential pressure transducer comprising an integral body having first and second cavities on opposite side portions defining a central bending beam therebetween, strain gauge means secured to said bending beam for connection to an electrical read-out, and first and second fluid coupling means for communicating first and second pressures, the difference between which is to be measured, to said first and second cavities respectively, the improvement including: first and second diaphragms in said cavities; and first and second force transmitting means disposed between opposite portions of said bending beam and central portions of said diaphragms for transmitting the pressure forces exerted on said diaphragms to opposite sides of said bending beam so that bending of said beam is responsive only to the difference between said forces, each of said diaphragms comprising: a circular disc of metal of given thickness having an outer surface facing its associated fluid coupling means so as to be exposed to fluid pressure and an inner surface having a central portion engaging an associated force transmitting means for said bending beam, the plane of said disc being substantially normal to the direction of force communicated from said disc to said beam by said force transmitting means, said disc having its outer peripheral marginal portion rigidly and sealingly secured to the periphery of its associated cavity by its associated fluid coupling means, said outer surface including a first annular groove defined by axially extending side walls, said groove being spaced radially inwardly from said marginal portion, said inner surface including second and third annular grooves radially spaced respectively on either side of said first annular groove to overlap said first groove in an axial direction such that portions of said axial walls of said first groove constitute common walls with adjacent walls of said second and third grooves, the ratio of the thickness of said disc at the floor of said first groove to the thickness of either of said common walls in a radial direction being greater than unity such that said common walls function as flexure means to permit inward axial movement of the central area of said disc in a manner to exert a substantially consistent reaction force to a given differential pressure independent of the absolute pressure exerted on the outer surface of said diaphragm.

5. The subject matter of claim 4, in which said ratio is between 1.35 and 1.65.

6. The subject matter of claim 4, in which said force transmitting means includes a ball bearing disposed between the center of the inner surface of the associated diaphragm and one side of said bending beam whereby force transmitted to said bending beam as a result of pressure applied to said assocaited diaphragm is always normal to the plane of said associated diaphragm.

References Cited

UNITED STATES PATENTS

| Re. 19,902 | 3/1936 | Sprague et al. | 73—408 |
| 2,760,260 | 8/1956 | Melchior | 73—406 |

FOREIGN PATENTS

| 662,642 | 4/1964 | Italy. |

LOUIS R. PRINCE, Primary Examiner

D. E. CORR, Assistant Examiner

U.S. Cl. X.R.

92—104